US011694398B1

(12) United States Patent
Monaghan

(10) Patent No.: US 11,694,398 B1
(45) Date of Patent: Jul. 4, 2023

(54) SYSTEMS AND METHODS FOR EDITING, ANIMATING, AND PROCESSING POINT CLOUDS USING BOUNDING VOLUME HIERARCHIES

(71) Applicant: Illuscio, Inc., Culver City, CA (US)

(72) Inventor: Robert Monaghan, Ventura, CA (US)

(73) Assignee: Illuscio, Inc., Culver City, CA (US)

(*) Notice: Subject to any disclaimer, the term of this patent is extended or adjusted under 35 U.S.C. 154(b) by 0 days.

(21) Appl. No.: 17/930,653

(22) Filed: Sep. 8, 2022

Related U.S. Application Data

(63) Continuation of application No. 17/700,856, filed on Mar. 22, 2022, now Pat. No. 11,443,482.

(51) Int. Cl.
*G06T 17/00* (2006.01)
*G06T 1/60* (2006.01)

(52) U.S. Cl.
CPC .............. *G06T 17/005* (2013.01); *G06T 1/60* (2013.01)

(58) Field of Classification Search
CPC ............ G06T 1/20; G06T 1/60; G06T 17/005
USPC ........................................................ 345/420
See application file for complete search history.

(56) References Cited

U.S. PATENT DOCUMENTS

| 6,222,557 | B1 | 4/2001 | Pulley, IV et al. |
| 6,313,838 | B1 | 11/2001 | Deering |
| 9,600,929 | B1 | 3/2017 | Young et al. |
| 10,861,175 | B1 | 12/2020 | Monaghan et al. |
| 2007/0097120 | A1 | 5/2007 | Wheeler et al. |
| 2009/0100366 | A1 | 4/2009 | Fitzmaurice et al. |
| 2010/0085353 | A1 | 4/2010 | Zhou et al. |
| 2014/0044343 | A1 | 2/2014 | Bell et al. |
| 2014/0198097 | A1 | 7/2014 | Evans |
| 2018/0143023 | A1 | 5/2018 | Bjorke et al. |
| 2018/0144547 | A1 | 5/2018 | Shakib et al. |
| 2018/0350044 | A1 | 12/2018 | Ponto et al. |
| 2020/0389669 | A1 | 12/2020 | Lucas |
| 2021/0042964 | A1 | 2/2021 | Yeung et al. |

OTHER PUBLICATIONS

Rico Richter, Soren Discher, Jurqen Dollner, "Out-of-Core Visualization of Classified 3D Point Clouds", 2015, Springer, 3D Geoinformation Science, Lecture Notes in Geoinformation and Cartography, pp. 227-242.

(Continued)

*Primary Examiner* — Jacinta M Crawford
(74) *Attorney, Agent, or Firm* — Ansari Katiraei LLP; Arman Katiraei; Sadiq Ansari

(57) ABSTRACT

Disclosed is a system that receives a point cloud, and that generates a Bounding Volume Hierarchy ("BVH") based on the point cloud data points. The BVH includes leaf nodes and parent nodes at one or more levels above the leaf nodes. The leaf nodes correspond to the point cloud data points. The system may receive input for adjusting a first set of elements of data points that are identified based on values specified for a second set of elements, and may locate those data points by traversing the BVH to arrive at a particular parent node that encompasses the values specified for the second set of elements. The system may then modify, based on the input, the first set of elements of a set of data points that correspond to a set of leaf nodes from the BVH that are directly or indirectly linked to the particular parent node.

20 Claims, 10 Drawing Sheets

(56) References Cited

OTHER PUBLICATIONS

Rico Richter, Jurqen Dollner, "Out-of-Core Real-Time Visualization of Massive 3D Point Clouds", Jun. 23, 2010, ACM, AFIGRAPH '10: Proceedings of the 7th International Conference on Computer Graphics, Virtual Reality, Visualisation and Interaction in Africa, pp. 121-128.

Enrico Gobbetti, Fabio Marton, "Layered point clouds: a simple and efficient multiresolution structure for distributing and rendering gigantic point-sampled models", 2004, Elsevier, Computers & Graphics 28 (2004) 815-826.

Jiann-Yeou Rau, Jyun-Ping Jhan, Ya-Ching Hsu, "Analysis of Oblique Aerial Images for Land Cover and Point Cloud Classification in an Urban Environment", Mar. 2015, IEEE, IEEE Transactions on Geoscience and Remote Sensing, vol. 53, No. 3, pp. 1304-1319.

Thomas A. Funkhouser, Carlo H. Sequin, "Adaptive Display Algorithm for Interactive Frame Rates During Visualization of Complex Virtual Environments", Sep. 1993, ACM, SIGGRAPH '93: Proceedings of the 20th Annual Conference on Computer Graphics and Interactive Techniques, pp. 247-254.

SYSTEMS AND METHODS FOR EDITING, ANIMATING, AND PROCESSING POINT CLOUDS USING BOUNDING VOLUME HIERARCHIES

CLAIM OF BENEFIT TO RELATED APPLICATIONS

This application is a continuation of U.S. nonprovisional application Ser. No. 17/700,856 entitled "Systems and Methods for Editing, Animating, and Processing Point Clouds Using Bounding Volume Hierarchies", filed Mar. 22, 2022 and issued as U.S. Pat. No. 11,443,482, which is a continuation-in-part of U.S. nonprovisional application Ser. No. 17/551,397 entitled "Systems and Methods for Multi-Tree Deconstruction and Processing of Point Clouds", filed Dec. 15, 2021 and issued as U.S. Pat. No. 11,302,070, which is a continuation of U.S. nonprovisional application Ser. No. 17/485,922 entitled "Systems and Methods for Multi-Tree Deconstruction and Processing of Point Clouds", filed Sep. 27, 2021 and issued as U.S. Pat. No. 11,227,432. The contents of application Ser. Nos. 17/700,856, 17/551,397 and 17/485,922 are hereby incorporated by reference.

BACKGROUND

A point cloud may represent a three-dimensional ("3D") object or environment with millions or billions of data points. Each data point may capture the positioning and other characteristics of a different surface, feature, or article from the 3D object or environment at a corresponding point in space.

Editing, rendering, and/or processing a point cloud (e.g., all point cloud data points) may take several seconds due to the vast amounts of data within a single point cloud. Accordingly, users may convert point clouds into lower resolution or less detailed formats (e.g., pixelated, polygon, or mesh formats) when performing editing, animation, and/or other graphical processing tasks.

DETAILED DESCRIPTION OF PREFERRED EMBODIMENTS

The following detailed description refers to the accompanying drawings. The same reference numbers in different drawings may identify the same or similar elements.

Provided are systems and methods for editing, animating, and/or processing point clouds using one or more bounding volume hierarchies ("BVHs"). Specifically, the systems and methods may include converting or representing the data points that are stored in a point cloud first format to a BVH second format, and editing, animating, and/or processing the point cloud via modifications that are made or applied directly to the BVH format. Modifying the BVH format to edit, animate, and/or otherwise process a point cloud may use fewer resources and processing power than performing the same operations against the point cloud format and/or all data points of the point cloud.

In some embodiments, a point cloud system ("PCS") may generate a BVH or tree-based representation for the point cloud data points, and may efficiently select, edit, animation, and/or process different sets of data points based on traversals, comparisons, and changes of different levels of the BVH or tree-based representation. For instance, the PCS may efficiently locate a set of data points within a desired region of the point cloud via a single BVH traversal that eliminates the need to scan the positional elements of all data points in order to identify which data points are within the desired region. Similarly, the PCS may efficiently modify the selected set of data points by implementing a single change to a parent node or non-leaf node of the BVH, and by applying or propagating that change to each data point that is represented as a leaf node of the parent node or non-leaf node.

The PCS may efficiently animate a point cloud by applying the search and editing techniques to the point cloud in order to generate different frames for an animation or video. For instance, the PCS may change, store, and/or render only the branches within the BVH that correspond to the subset of data points that change from one frame of the animation to a next frame, rather than store all data points for each frame as an entirely new point cloud and render all the point cloud data points for each frame.

Figure 1:
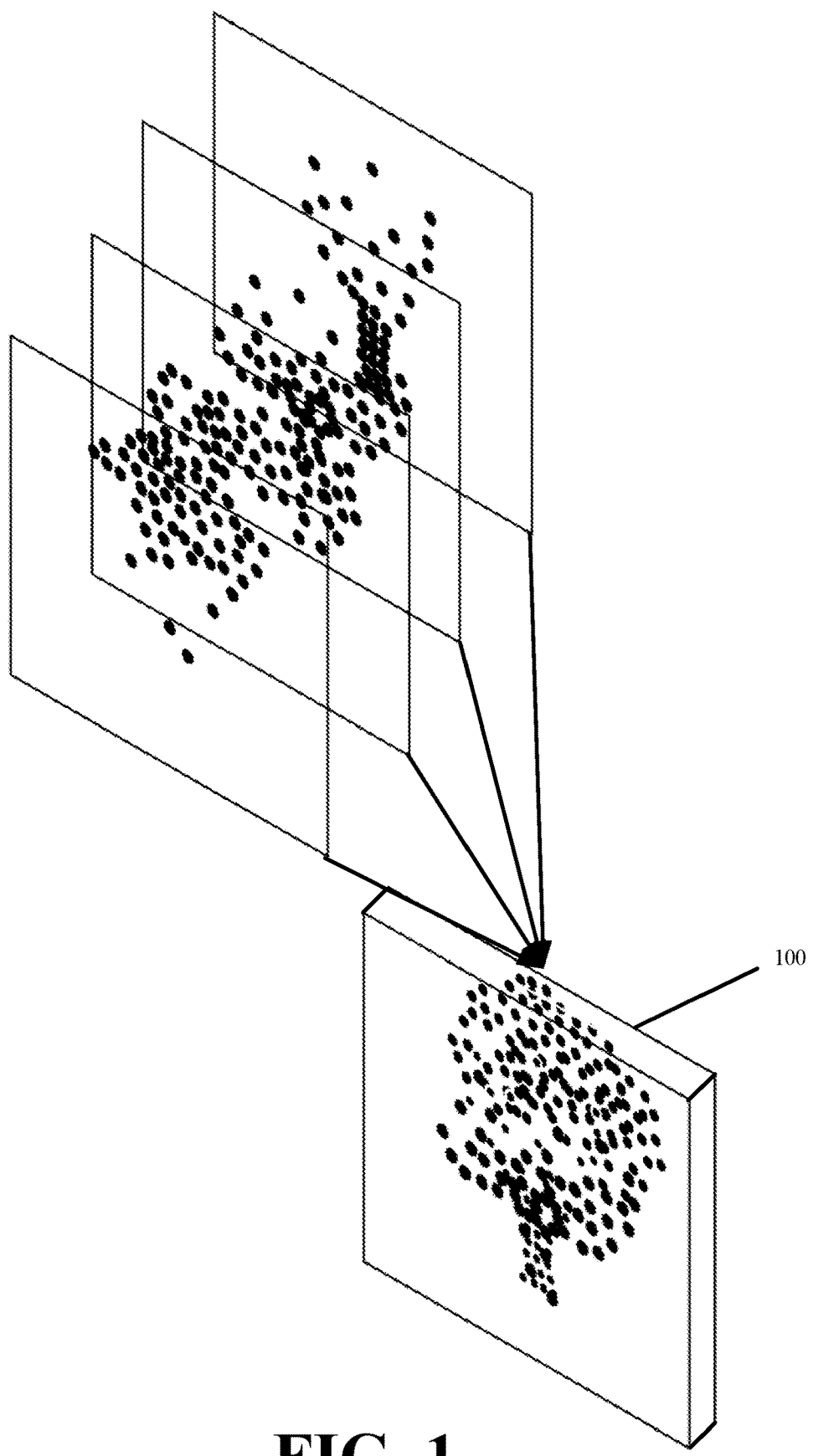
FIG. 1 illustrates an example point cloud that represents a three-dimensional ("3D") object or 3D environment using data points with different characteristics at different 3D positions.

A point cloud may include a set of data points for representing a three-dimensional ("3D") or volumetric object or environment. FIG. 1 illustrates an example point cloud 100 that represents a 3D object or 3D environment using data points with different characteristics at different 3D positions.

The point cloud data points may differ from pixels of a two-dimensional ("2D") image, because certain regions of point cloud 100 may have no data points, lower densities of data points, and/or higher densities of data points based on varying amounts of visual information that is detected at those regions. In contrast, pixels of a 2D image have a uniform density and fixed arrangement that is defined by the resolution of the 2D image. In other words, the point cloud data points may have a non-uniform placement or positioning, whereas the 2D image has pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of an imaged surface, feature, or article of the 3D object in 3D space.

The non-positional elements may include information about the detected characteristics of the surface, feature, or article imaged at a corresponding position in 3D space. The characteristics may correspond to a detected color. The color may be represented using red, green, blue ("RGB"), and/or other values. In some embodiments, the characteristics may provide the chrominance and/or luminance of the imaged surface, feature, or article. In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, red, green, blue, chrominance, luminance, tesla, and/or other values.

Point cloud 100 and the individual data points of point cloud 100 may be generated by a 3D or depth-sensing camera, Light Detection and Ranging ("LiDAR") sensor, Magnetic Resonance Imaging ("MM") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point.

The PCS may create a BVH or tree-based representation of a point cloud so that the selection, editing, animation, and/or processing of the point cloud may be performed in less time and with fewer resources than when performing the same operations directly against the point cloud and/or all data points of the point cloud. Creating the BVH or tree-based representation may include organizing and/or structuring the point cloud data points into a binary tree, octree, k-dimensional ("k-d") tree, or other tree-like structure.

Figure 2:
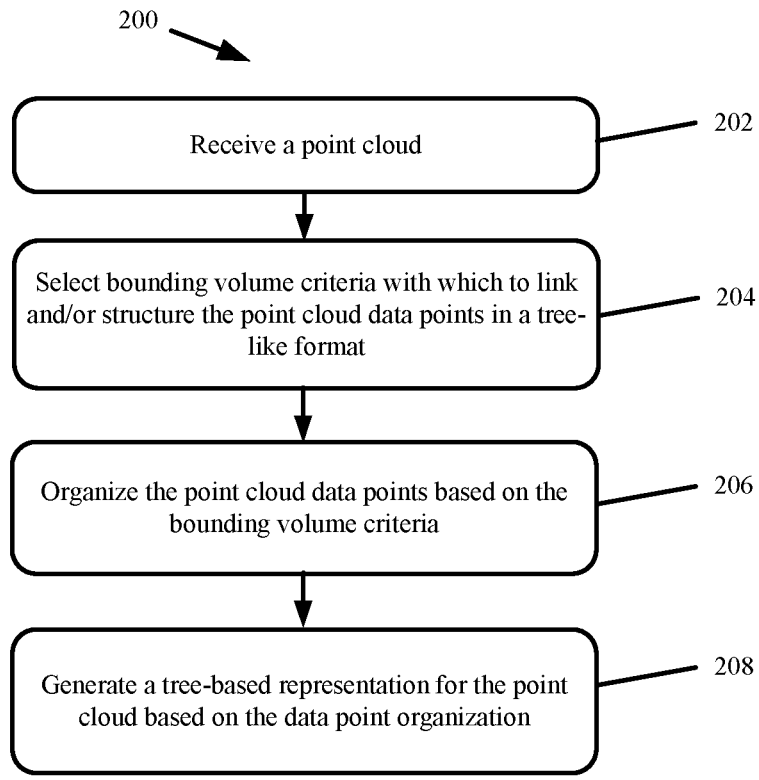
FIG. 2 presents a process for converting from a point cloud first format into a bounding volume hierarchy ("BVH") second format in accordance with some embodiments presented herein.

FIG. 2 presents a process 200 for converting from a point cloud first format into a BVH second format in accordance with some embodiments presented herein. Process 200 may be implemented by the PCS. In some embodiments, the PCS may include one or more devices with processors, non-transitory computer-readable medium, and/or other resources for accessing, rendering, manipulating, and/or otherwise interacting with point clouds and the 3D objects or 3D environments represented by those point clouds.

Process 200 may include receiving (at 202) the point cloud in the first format. The first format may include a file, image, data structure, and/or other container that stores the point cloud data points in a sorted or unsorted array. For instance, the first format may order the data points according to the positional data, and may store the positional and non-positional elements for all data points in the determined ordering.

Process 200 may include selecting (at 204) bounding volume criteria with which to link and/or structure the point cloud data points in a tree-like format. The bounding volume criteria may include ranges, conditions, or sought-after commonality for one or more positional elements and/or non-positional elements of the point cloud data points. For instance, the bounding volume criteria may specify arranging the point cloud data points in a BVH based on their positional data values (e.g., relative x, y, and/or z-coordinate positions), their distance from neighboring data points, commonality (e.g., a threshold amount of variance) in the data point coloring (e.g., RGB values), and/or commonality in one or more other positional and/or non-positional elements. The bounding volume criteria may be defined as conditional statements, regular expressions, and/or comparative definitions.

In some embodiments, different bounding volume criteria may be used to create different tree-based organizations or representations of the point cloud data points. For instance, first bounding volume criteria may be specified for the generation of a first tree representation that links and/or structures the point cloud data points based on their positional elements, and second bounding volume criteria may be specified for the generation of a second tree representation that links and/or structures the same point cloud data points differently based on their RGB color values (e.g., one or more non-positional elements). In other words, the PCS may generate two or more BVHs for the same point cloud, wherein each BVH may be used to efficiently perform different operations on the point cloud.

Process 200 may include organizing (at 206) the point cloud data points based on the bounding volume criteria. Organizing (at 206) the point cloud data points may include opening the point cloud file, determining relationships and/or commonality in the positional and non-positional elements of different sets of data points that satisfy the bounding volume criteria, and/or rearranging or restructuring the point cloud data points according to determined relationships and/or commonality.

Process 200 may include generating (at 208) a tree-based representation for the point cloud based on the data point organization. Generating (at 208) the tree-based representation may include representing the point cloud data points as leaf nodes of a binary tree, an octree, a k-d tree, or another tree according to the different relationships and/or commonality discovered using the bounding volume criteria, defining parent nodes based on the relationships and/or commonality between two or more data points organized as neighboring or related leaf nodes, and continuing an upward traversal from the parent nodes to a root node by decimating the positional and/or non-positional elements represented by each lower tier of the tree-based representation.

In some embodiments, each parent node of the tree may preserve the positional and/or non-positional relationships between the children nodes of that parent node. For instance, a parent node in the tree may represent a 3D volume or region, and all child or leaf nodes grouped under that parent node may include or correspond to data points with positional data elements that are within the 3D volume or region of the parent node. Similarly, a parent node in the tree may represent a particular range of colors, and all child or leaf nodes grouped under that parent node may include or correspond to data points with non-positional data elements that specify coloring in the particular range of colors.

In some embodiments, the values for the positional and/or non-positional elements of a parent node may be defined as the average, median, and/or other values that are derived from the same positional and non-positional elements of the children nodes linked to that parent node. In some embodiments, the positional and/or non-positional elements of a parent node may be defined as a range of values from one or more of the positional and non-positional elements (e.g., maximum and minimum data values) from the children nodes linked to that parent node.

Figure 3:
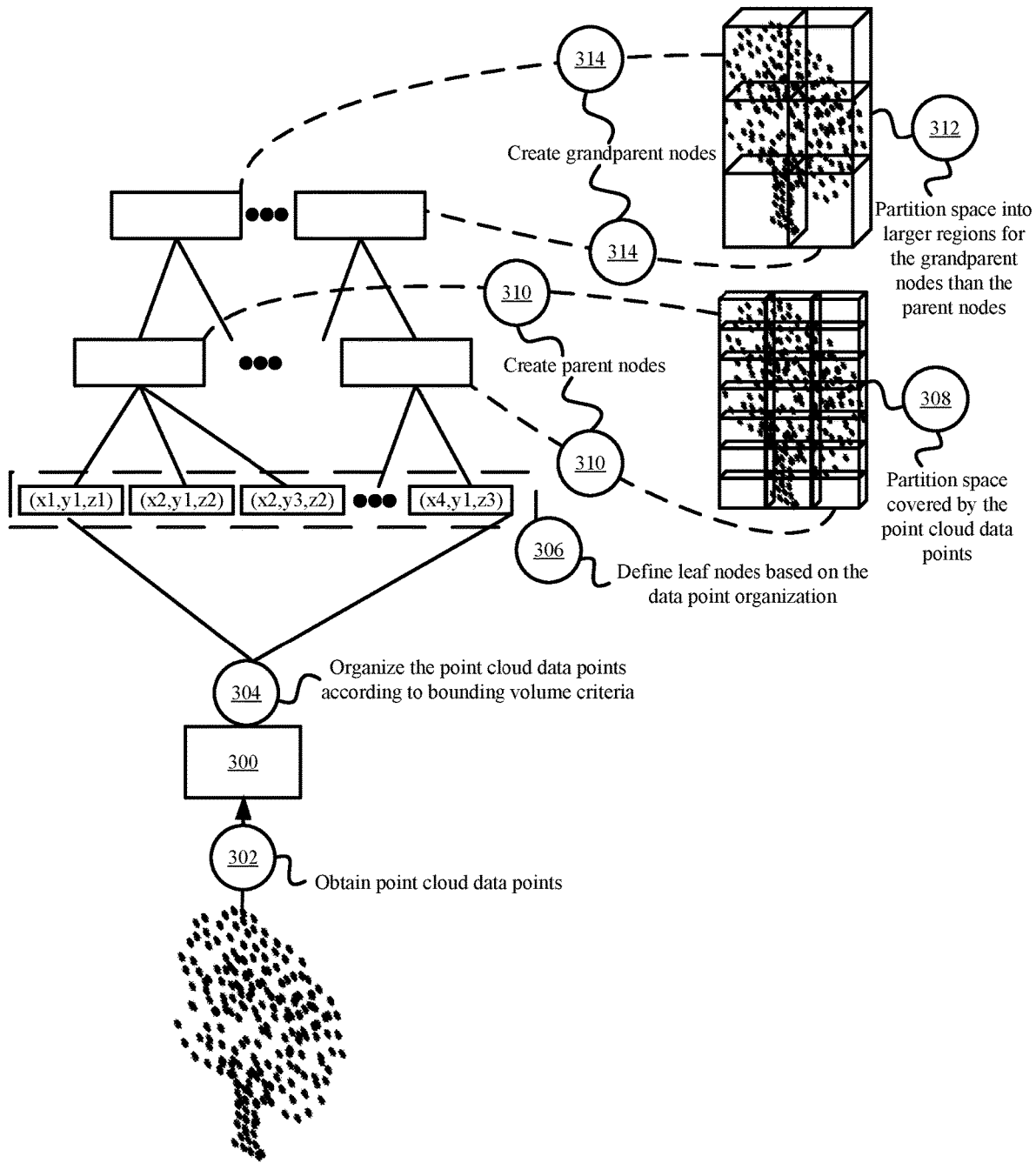
FIG. 3 illustrates an example of generating a tree-based representation of a point cloud in accordance with some embodiments presented herein.

FIG. 3 illustrates an example of generating a tree-based representation of a point cloud in accordance with some embodiments presented herein. As shown in FIG. 3, PCS 300 may obtain (at 302) the data points that are stored within a point cloud file. PCS 300 may organize (at 304) the point cloud data points according to bounding volume criteria. In this example, the bounding volume criteria may specify arranging the point cloud data points based on relationships and/or commonality in their positional data values.

PCS 300 may define (at 306) the leaf nodes of the tree-based representation according to the organization of the point cloud data points using the bounding volume criteria. Each leaf node may represent or correspond to a different data point of the point cloud. In some embodiments, each leaf node may include a pointer to a data point. For instance, the positional elements of each data point may be stored as a pointer to the corresponding data point in the point cloud. In some other embodiments, each leaf node may store the values for all positional and non-positional elements of a different point cloud data point.

PCS 300 may add parent nodes for the volume or region of space spanned by two or more leaf nodes of the tree. For instance, PCS 300 may partition (at 308) the space that is spanned by the point cloud data points into equal sized cubes or other volumes of a first size, may create (at 310) a parent node for each cube or volume of the first size, and may link a parent node to one or more leaf nodes based on the positional values for the data points of the one or more leaf nodes falling within the region or volume of space represented by the parent node. If a parent node corresponds to an empty region of space (e.g., no data points within the cube or volume represented by the parent node), PCS 300 may cull or remove that parent node from the tree or may insert the parent node as an indicator for a region of empty space.

PCS 300 may continue constructing (at 312 and 314) the tree with higher levels of nodes (e.g., grandparent nodes) that represent cubes or other volumes of a size that is larger than the size of the lower-level nodes. PCS 300 may continue until the root node encompasses the space spanned by the point cloud.

PCS 300 may attribute non-positional information to a parent node based on the non-positional information of its children nodes. For instance, the RGB values for a parent node may be the average, mean, median, or other value computed or selected from the children node RGB values. Alternatively, the RGB values for a parent node may be defined as the maximum and minimum RGB values of the children nodes, or as a range of RGB values spanned by the RGB values of the children nodes. Accordingly, the definition of the parent node positional and non-positional values may be a lossy process.

In some embodiments, PCS 300 may generate the root node first, wherein the root node represents the particular region of 3D space spanned by all data points of the point cloud. In constructing a binary tree, PCS 300 may partition the particular region of 3D space into two equal sized cubes or volumes, may define children nodes under the root node for each cube or volume, and may continue subdividing the particular region of 3D space in this manner until the leaf nodes corresponding to the individual data points are reached. In constructing an octree, PCS 300 may partition the particular region of 3D space into eight equal sized cubes volumes, may define children nodes under the root node for each cube or volume, and may continue subdividing the particular region of 3D space in this manner until the leaf nodes corresponding to the individual data points are reached.

To optimize the tree construction and reduce the potential for empty nodes in the tree. PCS 300 may construct a k-d tree and may partition the particular region of 3D space spanned by a set of data points into two or more equal or unequal sized volumes. The size and/or shape of each volume may be determined by the number of data points, parent nodes, or children nodes that fall within that volume. For instance, PCS 300 may expand the size of a volume when the volume corresponds to empty space or encompasses fewer than one child node or one data point.

Although FIG. 3 illustrates an example of generating a first tree-based representation of a point cloud from the positional elements of the point cloud data points, PCS 300 may generate other tree-based representations for the same point cloud based on one or more other positional or non-positional elements of the point cloud data points. For instance, PCS 300 may generate a second tree-based representation for the point cloud that organizes the point cloud data points based on values for chrominance and luminance non-positional elements of the point cloud data points. PCS 300 may reference the first tree-based representation when editing the positioning of a set of data points, and may reference the second tree-based representation when adjusting the lighting for a visualization or image that is rendered from the point cloud data points.

Figure 4:
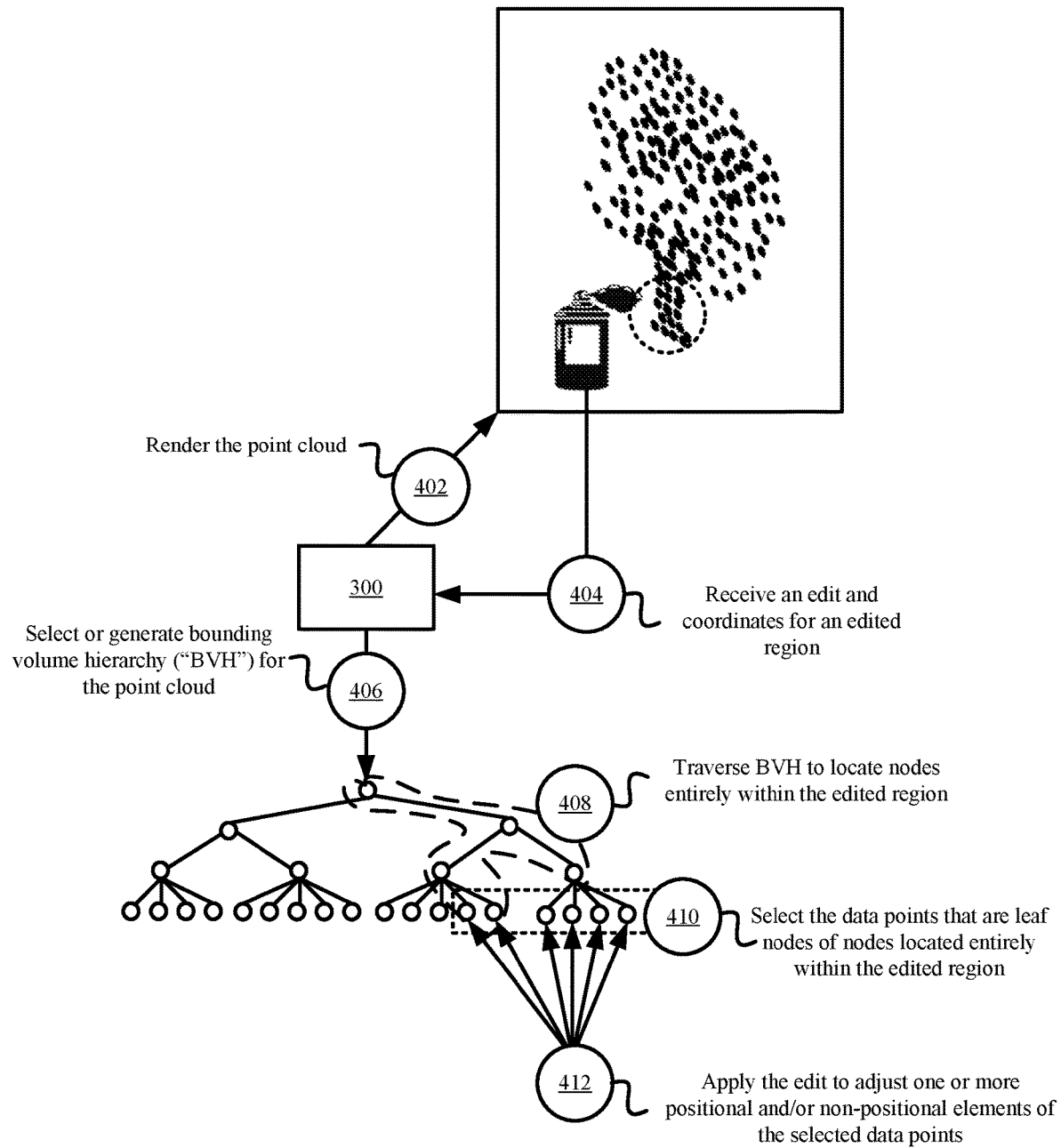
FIG. 4 illustrates an example of editing a point cloud using a BVH representation of the point cloud in accordance with some embodiments presented herein.

In any case, PCS 300 may reference the generated BVH representations when editing, animating, and/or otherwise processing a point cloud. FIG. 4 illustrates an example of editing a point cloud using a BVH representation of the point cloud in accordance with some embodiments presented herein.

As shown in FIG. 4, PCS 300 may render (at 402) the data points of a point cloud in order to generate a visualization or image of the 3D object or environment represented by that point cloud on a user device or an editing application. A user may use an editing tool to edit a particular region of the visualization or image. For instance, the editing tool may include a cutting tool to remove the particular region from the visualization or image, a paint tool to change the coloring of the particular region, an effects tool to adjust lighting or apply other effects to the particular region, and/or a tool to select and/or apply other changes to the positional and/or non-positional elements of the data points that produce the visualization for the particular region. PCS 300 may receive (at 404) coordinates for the edited region and the edit to be applied to the data points in the edited region.

PCS 300 may select and/or generate (at 406) the BVH for the point cloud being edited. PCS 300 may traverse (at 408) down from the root node of the BVH until reaching the one or more nodes with positional values that are entirely within the edited region. In other words, BVH may compare the positional values of each node to the coordinates of the edited region. If the positional values of a node are entirely within the edited region, PCS 300 may select that node and stop further traversals down from that node. If the positional values of a node are partially within the particular region, PCS 300 may continue the traversal until lower-level nodes or nodes further down from the node are entirely within the edited region. If the positional values of a node are entirely outside the edited region, PCS 300 may halt the traversals down that path of the BVH. In this manner, PCS 300 may select (at 410) all the data points within the edited region via the BVH traversals and without having to inspect the positional elements of all or a large set of the point cloud data points.

PCS 300 may apply (at 412) the edit to the selected nodes. In some embodiments, applying (at 412) the edit may include traversing down to the leaf nodes of each node that is located entirely within the edited region, adjusting the positional and/or non-positional elements of the leaf nodes based on the edit, and recomputing the positional and/or non-positional values for the parent nodes of the affected leaf nodes based on the adjusted positional and/or non-positional values. In some embodiments, applying (at 412) the edit may include adjusting the positional and/or non-positional values to each selected node and/or propagating the adjustment down to the children nodes and/or leaf nodes of each selected node. In some such embodiments, PCS 300 may compute the adjustment to the one or more positional and/or non-positional elements one time, and may apply that same adjustment to the children nodes or leaf nodes of each of the selected nodes.

In some embodiments, PCS 300 may store a BVH for an unedited point cloud, and may store each edit or change that is applied to the point cloud as a modified branch of the BVH. The modified BVH branches provide a condensed structure with which to store and track each change without losing the original point cloud data. For instance, rather than create a separate point cloud file each time an edit is applied or lose the original point cloud data by directly modifying the original point cloud data with each change, the modified BVH branches separately track each change in sequential order. Moreover, PCS 300 may use the modified BVH branches to efficiently revert or undo applied changes without having to reprocess the entire point cloud.

Figure 5:
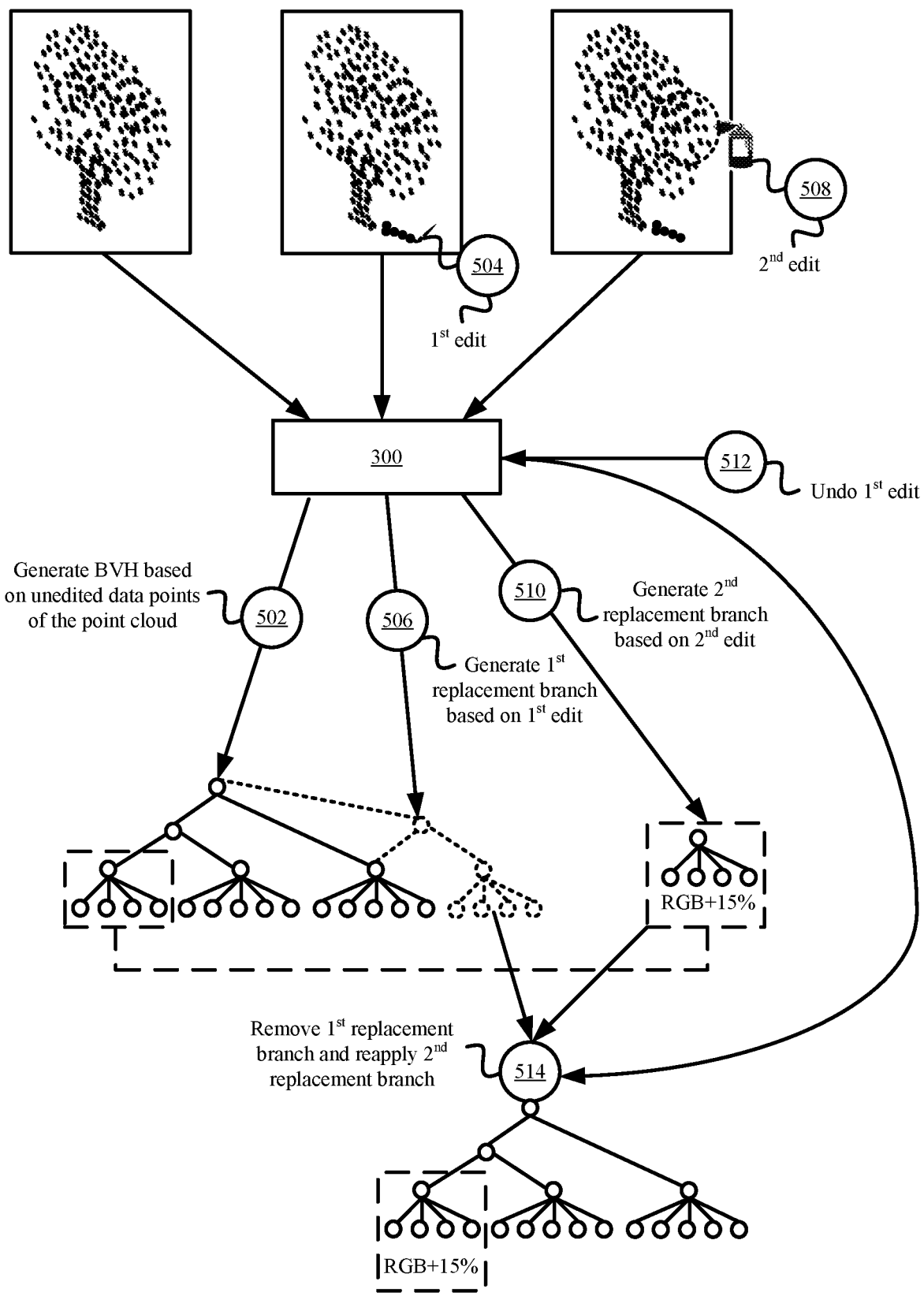
FIG. 5 illustrates an example of using modified BVH branches to separately track each change that is applied to a point cloud and to efficiently process the changes with the modified BVH branches in accordance with some embodiments presented herein.

FIG. 5 illustrates an example of using modified BVH branches to separately track each change that is applied to a point cloud and to efficiently process the changes with the modified BVH branches in accordance with some embodiments presented herein. As shown in FIG. 5, PCS 300 may generate (at 502) a BVH or tree-based representation for an unedited point cloud.

A first edit may be applied (at 504) to the point cloud. The first edit may modify the data points within the point cloud. For instance, the first edit may include a user using a paintbrush tool to add to the image. PCS 300 may generate (at 506) a first replacement BVH branch in response to the first edit, and may add the first replacement BVH branch to the original BVH. The first replacement BVH branch may include leaf nodes that are defined with the positional and/or non-positional elements for a first set of data points that were added to the point cloud as a result of the first edit. PCS 300 may link or attach the first replacement BVH branch to the BVH at a position or node corresponding to where the set of data points are added to the point cloud.

A second edit may be applied (at 508) to the point cloud. The second edit may modify one or more positional or non-positional elements of a second set of the point cloud data points. For instance, the second edit may include a color adjustment tool for adjusting the colors of the second set of data points. PCS 300 may generate (at 510) a second replacement BVH branch in response to the second edit. The second replacement BVH branch may include the same nodes as a particular existing branch of the original BVH but with one or more different positional and/or non-positional values. In some embodiments, PCS 300 may replace the particular existing branch with the second replacement BVH branch, or may apply the second replacement BVH branch over the particular existing branch such that the nodes and data associated with the particular existing branch are not removed or lost, but are superseded by nodes and data associated with the second replacement BVH branch.

A user may request (at 512) to undo the first edit. In response to the request, PCS 300 may identify the first replacement BVH branch for the first edit, and may perform (at 514) the undo by removing the first replacement BVH branch from the original BVH. Removing the first replacement BVH branch may produce a corresponding change in the rendering of the point cloud. Specifically, removal of the first replacement BVH branch causes the first set of data points that were added as a result of the first edit to be removed from the rendered image or visualization. Accordingly, PCS 300 may efficiently apply or undo the first edit by processing the first set of data points included in the first replacement branch without processing other data points of the point cloud.

In some embodiments, PCS 300 may also undo all other edits (e.g., the second edit) that were applied after the first edit. In some other embodiments, PCS 300 may reapply all other edits that came after the second edit once the first edit is undone. For instance, as shown in FIG. 5, PCS 300 may reapply or retain the second replacement branch for the second edit to the original BVH after removing the first replacement branch for the first edit from the original BVH.

The replacement branches therefore provide PCS 300 an efficient structure with which to separately capture only the changes that are made to different sets of point cloud data points at different times or in response to different edit, and/or to process each change and the affected set of data points separate from the entire point cloud and other data points that are unaffected by the change. In some embodiments, PCS 300 may save the replacement branches with the BVH for the original unedited point cloud once the editing of the point cloud is complete. Consequently, PCS 300 may preserve the original unedited point cloud data along with each edit so that the edits can be applied and unapplied in a non-destructive manner at any time. In some other embodiments, PCS 300 may save the edited point cloud by saving a single BVH for the edited point cloud in which the nodes of the single BVH represent the last edited state of the point cloud.

As noted above, generating the tree-based representations may be a lossy process. For instance, values for the positional elements of a parent node (e.g., x, y, and z coordinates) may be defined as the average value of the positional elements of each child node or all leaf nodes under that parent node. Similarly, values for the non-positional elements of a parent node (e.g., color values) may be defined as a weighted mean or other values that are computed or derived from the non-positional elements of each child node or all leaf nodes under that parent node. Accordingly, in some embodiments, PCS 300 may perform an approximate matching to traverse the BVH and locate or select the nodes and corresponding data points affected by user input, edits, and/or other processing of the point cloud.

Figure 6:
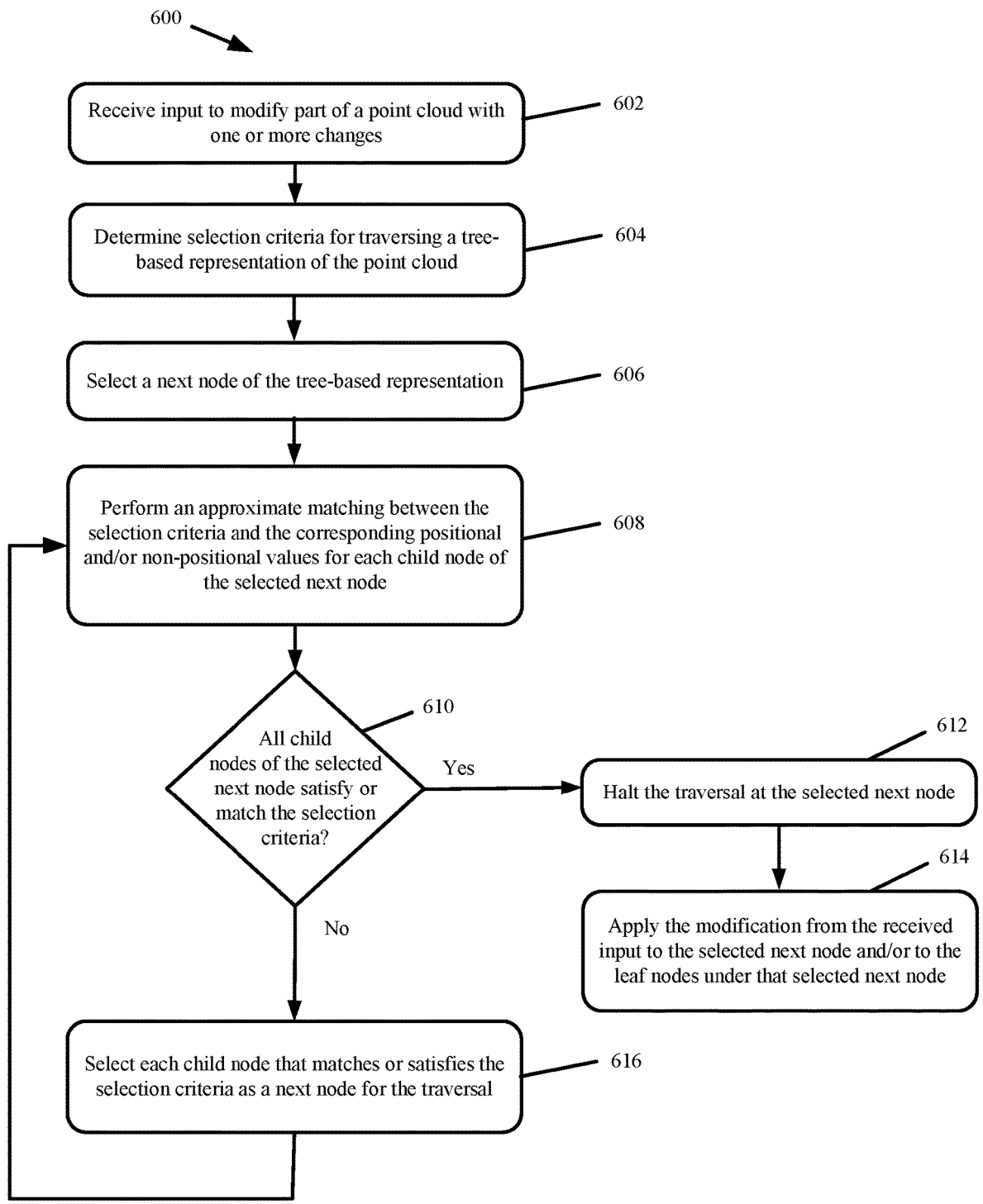
FIG. 6 presents a process for editing and/or processing a point cloud based on an approximate matching of BVH nodes in accordance with some embodiments presented herein.

FIG. 6 presents a process 600 for editing and/or processing a point cloud based on an approximate matching of BVH nodes in accordance with some embodiments presented herein. Process 600 may be implemented by PCS 300.

Process 600 may include receiving (at 602) input to modify part of a point cloud with one or more changes. The affected part of the point cloud may be a surface, feature, or object that is represented in a visualization of the point cloud by one or more data points, or may include data points that have some positional and/or non-positional commonality. The input may be manually entered by a user via an editing tool and/or a graphical user interface ("GUI"), or may be programmatically entered using one or more Application Programming Interfaces ("APIs") or other calls.

Process 600 may include determining (at 604) selection criteria for traversing a tree-based representation of the point cloud. For instance, the input may be defined to apply to data points in a particular region of the point cloud visualization, or may be defined to apply to data points that have a specific range of red color values and that are distributed across the point cloud. Accordingly, the selection criteria may be determined based on the received (at 602) input.

In some embodiments, PCS 300 may select a particular tree-based representation from a plurality of different tree-based representations created for the point cloud based on the selection criteria. In some such embodiments, each tree-based representation may organize the point cloud data points and may create the branches that link the leaf nodes to a root node via one or more tiers or levels based on different positional and/or non-positional values of the data points. For instance, a first tree-based representation may organize and link the data points based on their x, y, and z positional values, and a second tree-based representation may organize and link the data points based on their RGB color values.

Process 600 may include selecting (at 606) a next node of the tree-based representation for the traversal. At the start of the traversal, the next node may correspond to the root node.

Process 600 may include performing (at 608) an approximate matching between the selection criteria and the corresponding positional and/or non-positional values for each child node of the selected next node. Performing (at 608) the approximate matching may include comparing the selection criteria against the corresponding positional and/or non-positional values for each child node of the selected node, and determining which of the child nodes has positional and/or non-positional values that match or satisfy the selection criteria by a threshold value. For instance, the input and/or selection criteria may target data points that have a specific red color value or a red color value that is within a particular range. The approximate matching may determine that a child node of the selected next node with a defined red color value that is within 20% of the specific red color value or the particular range of color values is a match or satisfies the selection criteria.

In some embodiments, the approximate matching may include computing a score based on the comparison of the selection criteria to the corresponding positional and/or non-positional values for each child node of the selected node. The score may represent the amount of variance between the selection criteria and the positional and/or non-positional values of the child node, or may represent a probability that the positional and/or non-positional values of nodes beneath the child node satisfy the selection criteria. For instance, if the selection criteria specifies a particular color value, and the color value of the child node deviates from the particular color value by 15% and the child nodes includes 100 leaf nodes, then PCS 300 may compute a probability score of 80% that at least one of the leaf nodes is a match or satisfies the selection criteria.

Process 600 may include determining (at 610) if all child nodes of the selected next node match or satisfy the selection criteria by the threshold value. Process 600 may include halting (at 612) the traversal at the selected next node in response to determining (at 610—Yes) all children nodes of the selected next node match or satisfy the selection criteria. In this case, there is no need to traverse further down the tree-based representation since all nodes under the selected next node are subject to the edit. Process 600 may further include applying (at 614) the modification from the received (at 602) input to the selected next node and/or to the leaf nodes under that selected next node. In this manner, all leaf nodes under the selected next node are automatically selected to receive the modification or edit. Process 600 may include continuing the traversal in response to determining (at 610—No) that all child nodes of the selected next node do not match or satisfy the selection criteria by the threshold value. Continuing the traversal may include selecting (at 616) each child node that matches or satisfies the selection criteria as a next node for the traversal, and performing (at 608) the approximate matching between the selection criteria and the corresponding positional and/or non-positional values for each child node of the newly selected next node.

In some embodiments, PCS 300 may use the BVH and BVH replacement branches as an efficient format for encoding and rendering point cloud animations. A point cloud animation may include a sequence of different point clouds with each point cloud containing the data points for a different frame or image of the animation. Each point cloud in the animation may have some variation in the positional and/or non-positional values of one or more data points from a prior point cloud. The variation may capture the change or motion that occurred from one frame of the animation to a next frame. Accordingly, to reduce the amount of data that is stored for the animation and to reduce the processing resources to render a point cloud animation without losing the level of detail that is afforded by a point cloud, some embodiments may define a BVH with a set of BVH replacement branches to encode the changes that occur from frame to frame in the animation.

Figure 7:
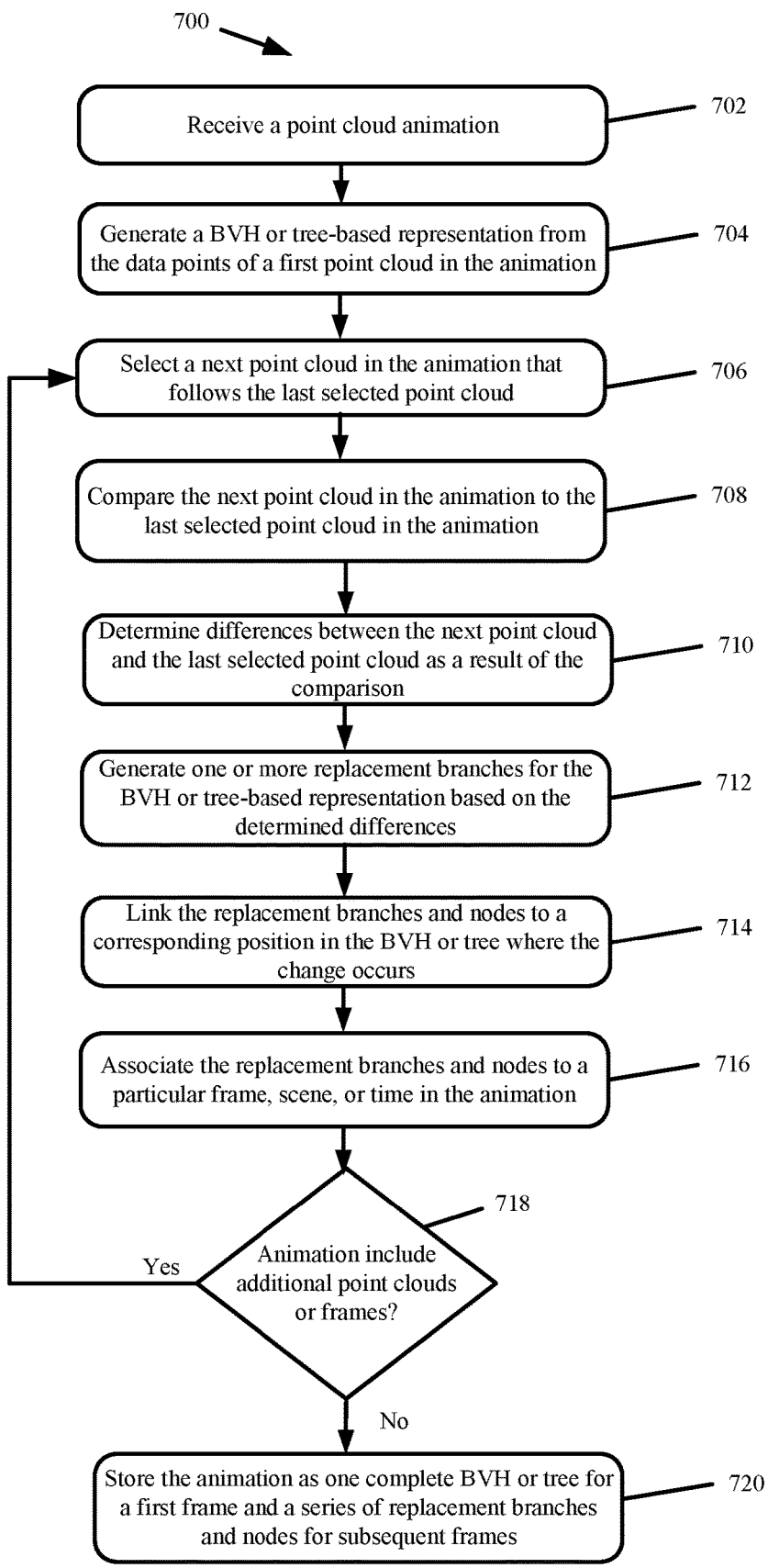
FIG. 7 presents a process for encoding a point cloud animation using BVHs for the changes to the point cloud over the duration of the animation.

FIG. 7 presents a process 700 for encoding a point cloud animation using BVHs for the changes to the point cloud over the duration of the animation. Process 700 may be implemented by PCS 300.

Process 700 may include receiving (at 702) a point cloud animation. In some embodiments, the point cloud animation may include one or more files that encode each frame or image of a video or animation as a different point cloud with a complete set of data points for all image data for the animation frame encoded in that point cloud. In other words, each point cloud of the point cloud animation may have all the point cloud data points needed to render a scene of the animation without referencing any information from other point clouds of the animation. In some embodiments, the point cloud animation may include a feed from a camera that has yet to be converted to a point cloud format, or from a point cloud imaging device that produces a point cloud at a rate required for the animation or video (e.g., 24 frames per second or greater).

Process 700 may include generating (at 704) a BVH or tree-based representation from the data points of a first point cloud in the animation. The first point cloud may store all the data points within a first frame or scene of the animation. Generating (at 704) the BVH or tree-based representation may include converting from the point cloud format to a structured BVH format. For instance, generating (at 704) the BVH or tree-based representation may include structuring the point cloud data points into a binary tree, octree, k-d tree, or other tree format where the point cloud data points are represented by the leaf nodes and each parent node summarizes or contains the values for two or more lower-tier data points. The BVH or tree-based representation may include branches that link each parent node to two or more children nodes with each branch representing a relationship or commonality between the parent node and the two or more children nodes. For instance, a branch may indicate that the children nodes are within the region or volume encompassed by the parent node, or a branch may indicate that the children nodes have RGB values within a range of RGB values covered by the parent node.

Process 700 may include selecting (at 706) a next point cloud in the animation that follows the last selected point cloud. For instance, PCS 300 may select the second point cloud in the animation that stores the data for a second frame or scene that follows the first frame or scene of the animation stored within the first point cloud. In some embodiments, PCS 300 may receive the raw video data from an image capture device, and may generate the next point cloud as the raw video data is received. In some other embodiments, the point cloud animation may sequentially store the different point clouds for the point cloud animation, and may reencode the point cloud animation with the BVHs.

Process 700 may include comparing (at 708) the next point cloud in the animation to the last selected point cloud in the animation. For the second frame of the animation, the comparison (at 708) may include comparing (at 708) the second point cloud to the first point cloud.

Process 700 may include determining (at 710) differences between the next point cloud and the last selected point cloud as a result of the comparison. The differences may include identifying any data points in the last selected point cloud that have changed or no are longer found in the next point cloud, and identifying any data points in the next point cloud that do not have matching equivalents in the last selected point cloud. For instance, a first detected difference may include a data point whose positional data values have changed from the first and second point clouds, and a second detected difference may include a data point whose positional data values remain the same but a color value or another non-positional value has changed from the first and second point clouds.

Process 700 may include generating (at 712) one or more replacement branches for the BVH or tree-based representation of the first point cloud based on the determined (at 710) differences between the next point cloud and the last selected point cloud. The one or more replacement branches do not replace the BVH or tree-based representation that is generated for the first point cloud. Instead, the one or more replacement branches may modify the leaf nodes and connected branches for the data points that have changed from the first point cloud to the second point cloud. In some embodiments, the one or more replacements branches may remain separate from the BVH or tree-based representation and may be associated with a next frame in the animation.

Process 700 may include linking (at 714) the replacement branches and nodes to a corresponding position in the BVH or tree where the change occurs. For instance, if motion or other change in visual characteristics occurs in the bottom left region of the 3D environment represented by the first point cloud, then the branches and nodes for the data points that render that bottom left region of the 3D environment may be updated and/or replaced with branches and nodes for updated data points that capture the motion or other change in the visual characteristics occurring in the bottom left region.

Process 700 may include associating (at 716) the replacement branches and nodes to a particular frame, scene, or time in the animation. For instance, the BVH generated for the first point cloud in the point cloud animation may be associated with a first frame of the animation, and the one or more replacement branches created based on the differences between the first point cloud and a second point cloud in the point cloud animation may be associated with a second frame of the animation. In this manner, the one or more replacement branches may contain only the changes that occur from one frame to a next, and may not contain all the data points needed to render a full frame without referencing the first frame rendered from the BVH and changes that were made in subsequent frames by earlier replacement branches. Associating (at 716) the replacement branches may include adding a frame, scene, or time identifier in the root node of the replacement branch or in one or more nodes of the replacement branch.

Process 700 may include determining (at 718) if the animation includes additional point clouds or frames with different data that have yet to be converted to replacement tree branches or nodes. In response to determining (at 718—Yes) that additional point clouds or frames remain, process 700 may include selecting (at 706) the next point cloud in the animation, comparing (at 708) the next point cloud in the animation to the last selected point cloud in the animation, determining (at 710) the differences between the compared point clouds, generating (at 712) the replacement branches and/or nodes based on the determined differences, linking (at 714) the replacement branches and/or nodes to the BVH or tree, and/or associating (at 716) the replacement branches and/or nodes to a particular frame, scene, or time in the animation.

In response to determining (at 718—No) that the animation is complete, process 700 may include storing (at 720) the animation as one complete BVH or tree that contains all data points and values for a first frame of the animation, and a series of replacement branches and nodes that represent the different sets of data points in the point cloud animation that change from an earlier frame to the frame associated with the frame, scene, or time identifier of the replacement branch.

Figure 8:
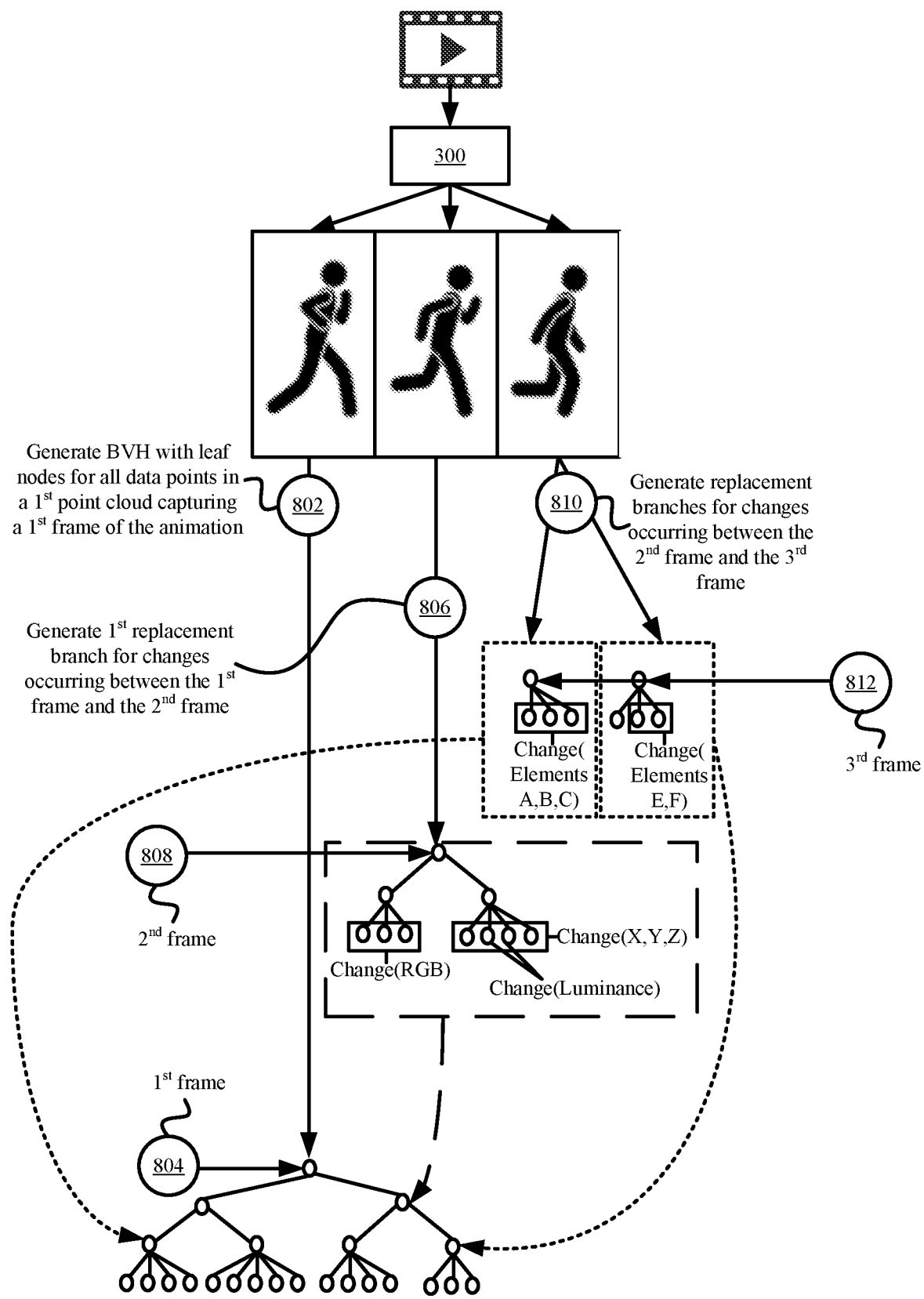
FIG. 8 illustrates an example of encoding an animation involving a series of point clouds as a BVH or tree and a series of replacement branches for the BVH or tree in accordance with some embodiments presented herein.

FIG. 8 illustrates an example of encoding an animation involving a series of point clouds as a BVH or tree and a series of replacement branches for the BVH or tree in accordance with some embodiments presented herein. As shown in FIG. 8, PCS 300 may generate (at 802) a complete BVH or tree based on all the data points of a first point cloud that captures a first frame or image of the animation. Specifically, the leaf nodes of the complete BVH or tree may contain all the positional data and non-positional data for every surface, feature, or object of the first frame or image. PCS 300 may associate (at 804) a first frame identifier to the BVH to indicate that the BVH contains the data for rendering the first frame of the animation.

PCS 300 may generate and store subsequent frames or images of the animation as replacement branches for the BVH or tree. Each replacement branch may update a subset of the leaf nodes of the complete BVH or tree, and/or the branches that define the commonality or relationships between the updated leaf nodes. Each replacement branch may be linked to a particular position in the BVH or tree that corresponds to a position where motion or other change occurs in the animation. In other words, the replacement branches are not a complete BVH or tree, and do not contain all the data points or data point data values that are needed to render an entire frame or image of the image. Instead, the replacement branches may contain a subset of the data points for updating one or more parts of a previous frame or image with the motion or changes that occur between that previous frame or image and a next frame or image of the animation.

For instance, PCS 300 may generate (at 806) a first replacement branch for the motion and/or adjusted non-positional elements that occur to a set of data points between the first frame and a second frame of the animation. PCS 300 may associate (at 808) a second frame identifier to the first replacement branch to indicate that the first replacement branch contains the data for updating different parts of the first frame in order to generate the second frame.

PCS 300 may (at 810) a second replacement branch for the motion and/or adjusted non-positional elements that occur to a different set of data points between the second frame and a third frame of the animation. PCS 300 may associate (at 812) a third frame identifier to the second replacement branch to indicate that the second replacement branch contains the data for updating different parts of the second frame, that is rendered based on the BVH being updated with the first replacement branch, in order to generate the third frame.

Figure 9:
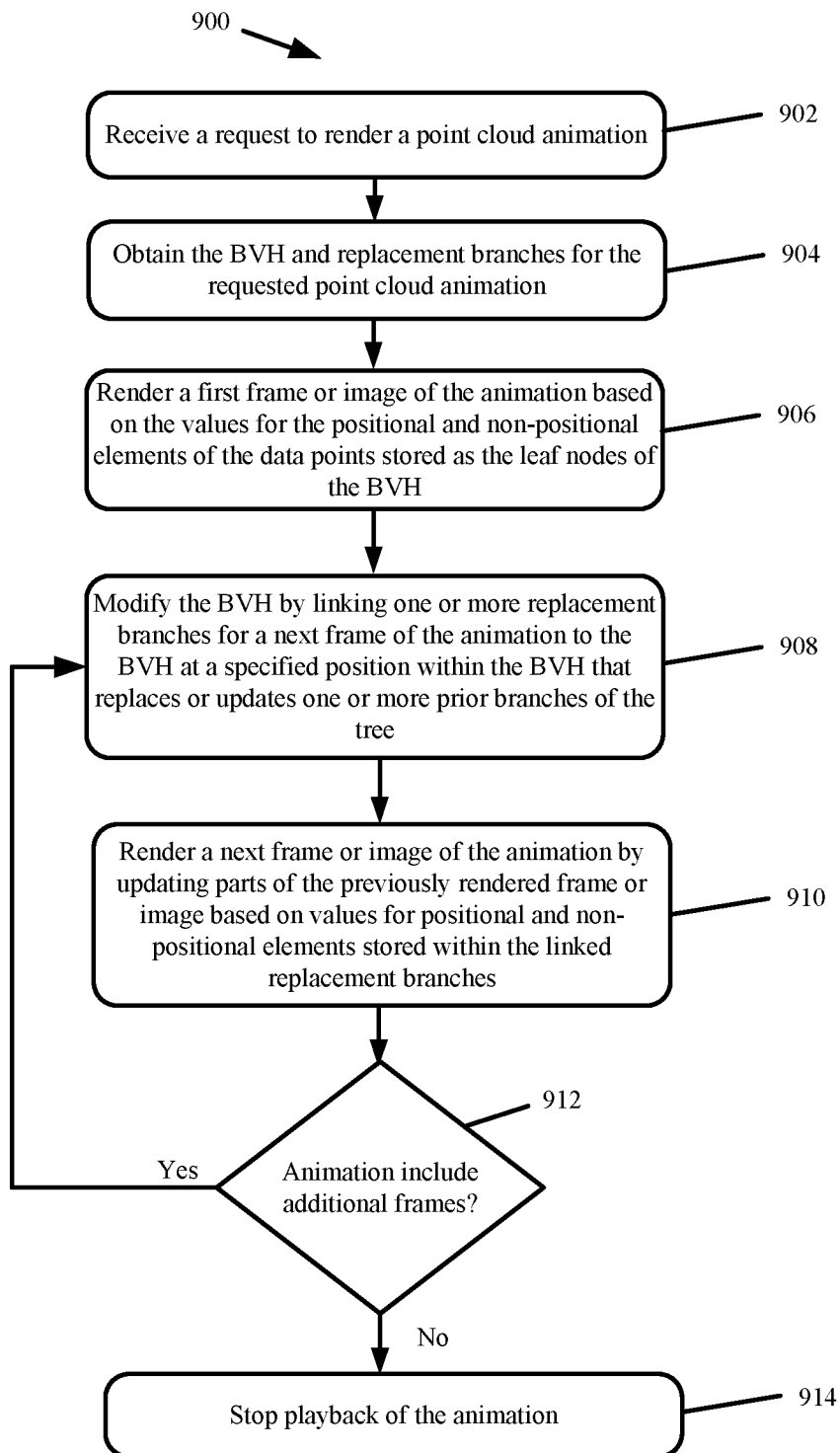
FIG. 9 presents a process for rendering a point cloud animation based on a BVH and replacement branch encoding of the animation in accordance with some embodiments presented herein.

FIG. 9 presents a process 900 for rendering a point cloud animation based on a BVH and replacement branch encoding of the animation in accordance with some embodiments presented herein. Process 900 may be implemented by PCS 300.

Process 900 may include receiving (at 902) a request to render a point cloud animation. The request may identify an animation or video file name, and may be submitted in response to a user opening a particular point cloud animation file.

Process 900 may include obtaining (at 904) the BVH and replacement branches for the requested point cloud animation. In some embodiments, the BVH and replacement branches may be stored as the point cloud animation. In other words, the PCS 300 may convert an animation that is originally captured with a series of point clouds to one or more BVHs and replacement branches for the BVHs, and may store the BVHs and replacement branches as the animation instead of the series of point clouds.

Process 900 may include rendering (at 906) a first frame or image of the animation based on the values for the positional and non-positional elements of the data points stored as the leaf nodes of the BVH. Specifically, the BVH may contain all the data points from a point cloud, wherein the point cloud data points include all the data necessary for generating the first frame or image without referencing other frames, point clouds, BVHs, or replacement branches. Rendering (at 906) the first frame or image may include traversing the BVH, and presenting a visualization for each data point that is represented as a leaf node in the BVH on a display device.

Process 900 may include modifying (at 908) the BVH by linking one or more replacement branches for a next frame of the animation to the BVH at a specified position within the BVH that replaces or updates one or more prior branches of the BVH. Specifically, PCS 300 may modify (at 908) the BVH to add a first subset of data points that capture the motion and/or changes that occurred from the last rendered frame to a next frame, and/or to replace a second subset of data points that were previously rendered but have changed as a result of the motion and/or changes.

Process 900 may include rendering (at 910) a next frame or image of the animation by updating parts of the previously rendered frame or image based on values for positional and non-positional elements stored within the linked replacement branches. Accordingly, rendering (at 910) the next frame or image may include retaining the visualizations of the previous frame or image that have not changed and that were rendered based on positional and non-positional elements of data points that were not modified by the one or more replacement branches, and updating the parts of the previous frame or image that have changed based on the one or more branches that are removed from the BVH and the one or more replacement branches that are linked to the modified BVH.

Process 900 may include determining (at 912) if the animation includes additional frames or images. In response to determining (at 912—Yes) that additional frames or images have yet to be rendered, process 900 may include modifying (at 908) the BVH with the next replacement branch for the next frame or image of the animation, and rendering (at 910) the next frame or image based on the motion and/or other changes captured within the next replacement branch for the next frame or image. In response to determining (at 912—No) that the animation is complete, process 900 may include stopping (at 914) playback of the animation.

In some embodiments, PCS 300 may perform the tree-based encoding of the animation in parallel with the rendering of the animation. In some such embodiments, PCS 300 may convert a first point cloud that represents a first frame of the animation to a BVH or tree-based representation, and may render the first frame based on the values of the point cloud data points. While rendering the first frame, PCS 300 may simultaneously determine differences between the first frame and a next frame or between the first point cloud representing the first frame and a second point cloud representing the next frame, and may generate a replacement branch for the BVH and/or tree. Consequently, PCS 300 may prepare the replacement branches containing the subset of data points for the motion or change occurring between the first frame and the second frame while rendering the first frame. The replacement branches containing the motion or changes for the next frame may be rendered after the rendering of the first frame is complete.

Figure 10:
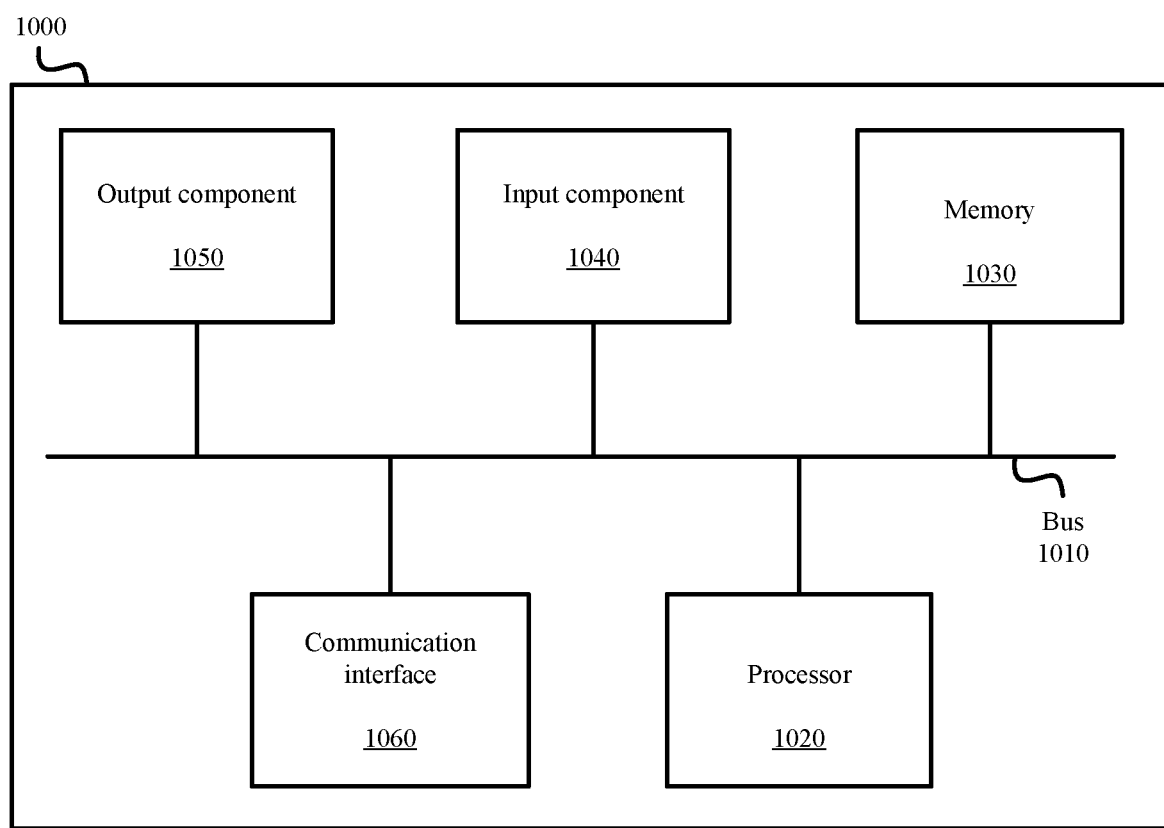
FIG. 10 illustrates example components of one or more devices, according to one or more embodiments described herein.

FIG. 10 is a diagram of example components of device 1000. Device 1000 may be used to implement one or more of the devices or systems described above (e.g., PCS 300, point cloud imaging devices, point cloud rendering devices, user devices, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving a point cloud comprising a plurality of data points that are distributed non-uniformly in a three-dimensional ("3D") space, the plurality of data points generating a first frame of an animation with each particular data point of the plurality of data points comprising a plurality of elements that define a position and visual characteristics of the particular data point in the 3D space;
generating a tree representation of the point cloud, the tree representation comprising a plurality of leaf nodes and a plurality of branches that connect two or more leaf nodes directly or indirectly to parent nodes at one or more levels above the plurality of leaf nodes, wherein the plurality of leaf nodes correspond to the plurality of data points;
detecting a set of the plurality of data points that change between the first frame and a second frame of the animation;
determining a particular branch from the plurality of branches that directly or indirectly connects to a set of leaf nodes that correspond to the set of data points that change between the first frame and a second frame of the animation;
generating a replacement branch for the particular branch, the replacement branch comprising a set of replacement leaf nodes that capture the change between the first frame and the second frame; and
encoding the first frame and the second frame of the animation with the tree representation and the particular replacement branch.

2. The method of claim 1 further comprising:
linking the replacement branch to a particular parent node of the tree representation that is a root node of the particular branch.

3. The method of claim 1, wherein encoding the first frame and the second frame comprises:
associating the replacement branch to the second frame of the animation.

4. The method of claim 1 further comprising:
receiving a second point cloud comprising all data points within the second frame of the animation;
comparing the second point cloud to the point cloud generating the first frame of the animation; and
wherein encoding the first frame and the second frame comprises:
storing the tree representation with the plurality of leaf nodes that correspond to the plurality of data points; and
storing the replacement branch with the set of replacement leaf nodes instead of the second point cloud and all data points within the second frame.

5. The method of claim 1, wherein the replacement branch comprises a root node, a set of branches that extend one or more levels below the root node via a subset of parent nodes and that terminate at the set of replacement leaf nodes, wherein the set of replacement leaf nodes correspond to one or more point cloud data points that animate the change between the first frame and the second frame.

6. The method of claim 1 further comprising:
rendering the plurality of data points;
presenting the first frame of the animation in response to rendering the plurality of data points;
rendering data points that correspond to the set of replacement leaf nodes from the replacement branch;
replacing one or more regions of the first frame in response to rendering the data points that correspond to the set of replacement leaf nodes; and
presenting the second frame of the animation after replacing the one or more regions of the first frame.

7. The method of claim 1,
wherein detecting the set of data points comprises determining a region of the first frame that changes between the first frame and the second frame and that encompasses the set of data points;
wherein determining the particular branch comprises selecting a particular parent node of the tree representation with a set of branches to leaf nodes that correspond to the set of data points in the region; and
wherein encoding the first frame and the second frame comprises linking the replacement branch to the particular parent node.

8. The method of claim 1, wherein encoding the first frame and the second frame comprises:
associating a first identifier for the first frame to the tree representation; and
associating a second identifier for the second frame to the replacement branch.

9. The method of claim 1 further comprising:
receiving a request to render the animation;
retrieving the tree representation and the replacement branch in response to the request;
generating the first frame of the animation based on values defined for the plurality of elements of the plurality of data points represented by the plurality of leaf nodes of the tree representation; and
generating the second frame of the animation based on values defined for the plurality of elements of data points represented by the set of replacement leaf nodes of the replacement branch.

10. The method of claim 1 further comprising:
generating the first frame of the animation based on the plurality of elements of the plurality of data points represented by the plurality of leaf nodes of the tree representation; and
updating parts of the first frame that were generated based on the plurality of elements of the set of data points with the plurality of elements of data points represented by the set of replacement leaf nodes of the replacement branch.

11. The method of claim 1 further comprising:
rendering the first frame of the animation based on the plurality of leaf nodes of the tree representation;
replace the particular branch of the tree representation with the replacement branch; and
rendering the second frame of the animation based on the set of replacement leaf nodes replacing the set of leaf nodes as a result of replacing the particular branch with the replacement branch.

12. The method of claim 1, wherein the tree representation corresponds to one of a binary tree, an octree, and a k-d tree.

13. The method of claim 1, wherein the plurality of branches organize the plurality of leaf nodes according to positional values of the plurality of data points with each branch of the plurality of branches corresponding to a different region of the first frame.

14. A system comprising:
one or more hardware processors configured to:
receive a point cloud comprising a plurality of data points that are distributed non-uniformly in a three-dimensional ("3D") space, the plurality of data points generating a first frame of an animation with each particular data point of the plurality of data points comprising a plurality of elements that define a position and visual characteristics of the particular data point in the 3D space;

generate a tree representation of the point cloud, the tree representation comprising a plurality of leaf nodes and a plurality of branches that connect two or more leaf nodes directly or indirectly to parent nodes at one or more levels above the plurality of leaf nodes, wherein the plurality of leaf nodes correspond to the plurality of data points;

detect a set of the plurality of data points that change between the first frame and a second frame of the animation;

determine a particular branch from the plurality of branches that directly or indirectly connects to a set of leaf nodes that correspond to the set of data points that change between the first frame and a second frame of the animation;

generate a replacement branch for the particular branch, the replacement branch comprising a set of replacement leaf nodes that capture the change between the first frame and the second frame; and encode the first frame and the second frame of the animation with the tree representation and the particular replacement branch.

15. The system of claim 14, wherein the one or more hardware processors are further configured to:
link the replacement branch to a particular parent node of the tree representation that is a root node of the particular branch.

16. The system of claim 14, wherein the one or more hardware processors are further configured to:
receive a second point cloud comprising all data points within the second frame of the animation;
compare the second point cloud to the point cloud generating the first frame of the animation; and
wherein encoding the first frame and the second frame comprises:
storing the tree representation with the plurality of leaf nodes that correspond to the plurality of data points; and
storing the replacement branch with the set of replacement leaf nodes instead of the second point cloud and all data points within the second frame.

17. The system of claim 14, wherein the one or more hardware processors are further configured to:
render the plurality of data points;
present the first frame of the animation in response to rendering the plurality of data points;
render data points that correspond to the set of replacement leaf nodes from the replacement branch;
replace one or more regions of the first frame in response to rendering the data points that correspond to the set of replacement leaf nodes; and present the second frame of the animation after replacing the one or more regions of the first frame.

18. The system of claim 14, wherein encoding the first frame and the second frame comprises:
associating a first identifier for the first frame to the tree representation; and
associating a second identifier for the second frame to the replacement branch.

19. The system of claim 14, wherein the one or more hardware processors are further configured to:
receive a request to render the animation;
retrieve the tree representation and the replacement branch in response to the request;
generate the first frame of the animation based on values defined for the plurality of elements of the plurality of data points represented by the plurality of leaf nodes of the tree representation; and
generate the second frame of the animation based on values defined for the plurality of elements of data points represented by the set of replacement leaf nodes of the replacement branch.

20. A non-transitory computer-readable medium storing program instructions that, when executed by one or more hardware processors, cause a computing system to perform operations comprising:
receive a point cloud comprising a plurality of data points that are distributed non-uniformly in a three-dimensional ("3D") space, the plurality of data points generating a first frame of an animation with each particular data point of the plurality of data points comprising a plurality of elements that define a position and visual characteristics of the particular data point in the 3D space;

generate a tree representation of the point cloud, the tree representation comprising a plurality of leaf nodes and a plurality of branches that connect two or more leaf nodes directly or indirectly to parent nodes at one or more levels above the plurality of leaf nodes, wherein the plurality of leaf nodes correspond to the plurality of data points;

detect a set of the plurality of data points that change between the first frame and a second frame of the animation;

determine a particular branch from the plurality of branches that directly or indirectly connects to a set of leaf nodes that correspond to the set of data points that change between the first frame and a second frame of the animation;

generate a replacement branch for the particular branch, the replacement branch comprising a set of replacement leaf nodes that capture the change between the first frame and the second frame; and encode the first frame and the second frame of the animation with the tree representation and the particular replacement branch.

* * * * *